United States Patent
Shah et al.

(10) Patent No.: US 11,034,352 B2
(45) Date of Patent: Jun. 15, 2021

(54) SYSTEMS AND METHODS FOR ENGINE AND TRANSMISSION CONTROL IN RESPONSE TO LOOK AHEAD DATA

(71) Applicant: Cummins Inc., Columbus, IN (US)

(72) Inventors: Nirav Shah, Columbus, IN (US); Daniel Reed Dempsey, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/596,186

(22) Filed: Oct. 8, 2019

(65) Prior Publication Data

US 2021/0101597 A1 Apr. 8, 2021

(51) Int. Cl.
*B60W 10/06* (2006.01)
*B60W 30/18* (2012.01)
*B60W 10/10* (2012.01)

(52) U.S. Cl.
CPC ............ *B60W 30/18* (2013.01); *B60W 10/06* (2013.01); *B60W 10/10* (2013.01); *B60W 2540/30* (2013.01); *B60W 2552/15* (2020.02); *B60W 2710/0666* (2013.01); *B60W 2710/105* (2013.01); *B60W 2720/106* (2013.01)

(58) Field of Classification Search
CPC ...... B60W 30/18; B60W 10/10; B60W 10/06; B60W 2552/15; B60W 2710/105; B60W 2720/106; B60W 2710/0666; B60W 2540/30

USPC .............................................. 701/55, 56, 65
See application file for complete search history.

(56) References Cited

U.S. PATENT DOCUMENTS

| | | | |
|---|---|---|---|
| 5,241,476 A | * | 8/1993 | Benford .............. F16H 61/0213 477/120 |
| 5,884,208 A | | 3/1999 | Byon |
| 8,099,220 B2 | | 1/2012 | Kim et al. |
| 9,020,726 B2 | | 4/2015 | Boeckenhoff et al. |
| 9,297,455 B2 | | 3/2016 | Li |
| 2007/0083316 A1 | | 4/2007 | Kurz et al. |
| 2008/0046166 A1 | | 2/2008 | Fakler et al. |
| 2010/0217489 A1 | * | 8/2010 | Turski ..................... F02D 41/28 701/48 |
| 2017/0043776 A1 | * | 2/2017 | Sujan .................... F02D 41/021 |
| 2018/0134291 A1 | * | 5/2018 | Burford ................ B60W 40/06 |
| 2020/0040836 A1 | * | 2/2020 | Oshita ................. F02D 41/3005 |
| 2020/0198659 A1 | * | 6/2020 | Ooshima ......... B60W 30/18009 |

FOREIGN PATENT DOCUMENTS

WO  20050124193  12/2005

* cited by examiner

*Primary Examiner* — Roger L Pang
(74) *Attorney, Agent, or Firm* — Taft Stettinius & Hollister LLP

(57) ABSTRACT

A control system, apparatus, and method integrates management of vehicle torque limits and gear shifting of a vehicle by determining future engine power requirements from the forward-looking route conditions to improve performance and drivability of the vehicle over what is achievable through default and/or currently selected torque limits and gear state shifting strategies.

20 Claims, 3 Drawing Sheets

SYSTEMS AND METHODS FOR ENGINE AND TRANSMISSION CONTROL IN RESPONSE TO LOOK AHEAD DATA

BACKGROUND

Vehicles may be equipped with various features that provide improved fuel economy. However, the improved fuel economy performance may not allow access to all the available torque and power of the engine. As a result, during certain conditions, drivability and performance of the vehicle can be negatively impacted. Therefore, there remains a significant need for the apparatuses, methods, and systems disclosed herein.

DISCLOSURE OF ILLUSTRATIVE EMBODIMENTS

For the purposes of promoting an understanding of the principles of the invention disclosed, reference will now be made to the embodiments illustrated in the drawings and specific language will be used to describe the same. It will nevertheless be understood that no limitation of the scope of the invention is thereby intended. Any alterations and further modifications in the illustrated embodiments, and any further applications of the principles of the invention as illustrated therein as would normally occur to one skilled in the art to which the invention relates, having the benefit of the present disclosure, are contemplated herein.

SUMMARY

Certain embodiments include unique vehicle systems including engine and transmission controls in response to look ahead conditions. Certain embodiments include unique engine and transmission control methods in response to look ahead conditions. Certain embodiments include unique electronic control systems implementing engine and transmission controls in response to look ahead conditions. Further embodiments, forms, objects, features, advantages, aspects, and benefits shall become apparent from the following description and drawings.

DESCRIPTION OF ILLUSTRATIVE EMBODIMENTS

Figure 1:
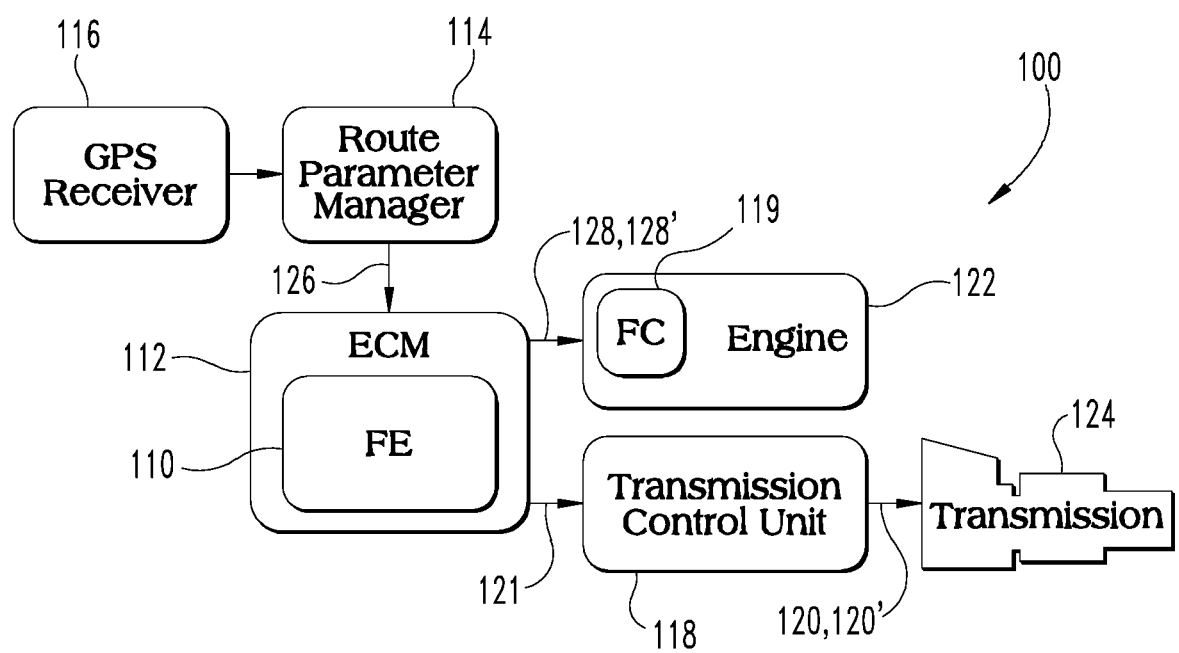
FIG. 1 is a schematic diagram of an exemplary vehicle system including engine and transmission controls.

With reference to FIG. 1, there is illustrated an exemplary vehicle system 100 according to an exemplary hardware architecture. The hardware architecture shown in FIG. 1 is but one example, and the vehicle system 100 may encompass a number of other hardware architectures. The vehicle system 100 includes speed and torque controls including integrated engine and transmission controls for an engine 122 and a transmission 124.

These controls may be included in a fuel efficiency (FE) controller 110 configured to generate one or both of an FE gear request 120 and an FE torque limit 128. FE gear request 120 and FE torque limit 128 are governed by fuel efficiency performance rather than vehicle acceleration and/or torque output performance such that less than all the available torque output of the engine 122 is available. In one embodiment, the FE control provided by the FE controller 110 is a user selected feature that makes less than all of the available torque output of the engine 122 available to the operator. In other embodiments, a FE controller 110 is not provided and the engine 110 operates in a standard or nominal mode with control from the electronic control unit (ECU) 112, such as an engine control module (ECM), in which less than all the available torque output of the engine 122 is available. The present disclosure automatically overrides the user selected FE performance limits imposed by FE controller 110 or other limits imposed by ECU 112 in order to make additional torque output available from engine 122 in response to look ahead route conditions.

Vehicle system 100 also includes ECU 112. The FE controller 110 and/or ECU 112 can override the determination of the FE torque limit 128 and FE gear request 120 from FE controller 110 to provide a modified a modified torque limit 128' and a performance mode request 121. The performance mode request 121 and modified torque limit 128' can be governed by vehicle acceleration performance and/or torque/power output requirements to satisfy one or more look ahead route conditions even at the cost of fuel efficiency performance.

The FE controller 110 may be incorporated into ECU 112. In the illustrated embodiment, ECU 112 is provided as an ECM configured to control a powertrain of the vehicle, including an engine 122 and/or a transmission 124, as shown in FIG. 1. Alternatively, the FE controller 110 may be a separate control unit configured to interface with the ECU 112. Fuel efficiency control logic, which may be implemented in the FE controller 110 and/or ECU 112, generates a transmission gear state request, also referred to as FE gear request, which may be communicated to a transmission control unit (TCU) 118. The FE or other gear request from the FE controller 110 and/or ECU 112 is interrogated by the TCU 118, which generates a gear command 120 sent to the transmission 124 to shift the transmission 124 into the gear state prescribed by the gear command. Thus, the FE controller 110 and/or ECU 112 may control the gear state of the transmission 124, which may be any suitable type of transmission, including but not limited to an automated manual transmissions, and other transmissions such as automatic, semi-automatic, manual, continuously variable, electric variable, planetary gear set, and dual-clutch transmissions.

The FE controller 110 and/or ECU 112 may accept input from a route parameter manager 114, which can provide the FE controller 110 and/or ECU 112 with information concerning the conditions of the route taken by the vehicle, referred to herein and shown in FIG. 1 as route condition information 126. The route condition information 126 may include a current route condition and a forward route condition. The current route condition may include the conditions of the route at the current location of the vehicle along the route. Example route condition information includes form-of-way and functional road classification. The forward route condition may include the conditions of the route for a certain distance or period in front of the vehicle along the route. The route associated with the forward route condition may be a projected route. The projected route may be a route programmed into a navigation system of the vehicle, which may communicate with the route parameter manager 114.

Alternatively, the projected route may be the route for a certain distance or period in front of the vehicle along its current trajectory.

The distance or period in front of the vehicle along its current and projected route for which forward route condition information data is available to the FE controller 110 and/or ECU 112 may be referred to as a "look-ahead window." The range or size of the look-ahead window may be determined by such factors as the speed of the vehicle, the availability of route condition information, and the resolution of the route condition information. Under certain operating conditions, only the current route condition may be available.

For example, the route condition information 126 may include the current grade (i.e., change of elevation or pitch) and current route pattern (i.e. on-ramp to interstate, merging lane, regular traffic lane, etc.) of the road where the vehicle is along its current course (i.e., the current route condition). As used herein, an on-ramp includes any road or route with a transition from a lower speed limit to a greater speed limit. Moreover, the route condition information 126 may include the grade of the road and route pattern for a certain distance along the projected route through the look-ahead window (i.e., the forward route condition). In such an embodiment, the route parameter manager 114 may provide the FE controller 110 and/or ECU 112 with look-ahead or forward grade and route pattern information, which the FE controller 110 and/or ECU 112 may use to determine the performance mode request 121 and modified torque limit 128'. The route condition information 126 may further include such information as traffic conditions, traffic control signs and signals, their type and location, posted and effective (i.e., actual travel rates) speed limits and, in certain embodiments, environmental conditions, such as precipitation and wind conditions.

Various aspects of the engine and transmission controls may use the route condition information 126 to determine the projected engine power and speed requirements for the look-ahead window. As one example, the projected engine power and speed requirements may then be used to predict vehicle speed deviations that require an increased power output than that provided nominally by the FE controller 110 through the FE gear command 120 and FE torque limit 128. Such vehicle speed deviations may be due to changes in the terrain grade, route pattern such as an on-ramp or merging traffic lane, traffic conditions, traffic control signs and signals and their location, or speed limits. The vehicle speed deviations may be, for example, from the current vehicle speed or maximum speed available under FE or nominal controls, or the rate of change of speed of the vehicle.

Based upon the determined engine power and speed requirements using the route condition information 126, the FE controller 110 and/or ECU 112 communicate the prescribed FE or nominal gear request to provide gear command 120 or modified gear command 120' from the TCU 118. The TCU 118 may act upon the performance mode request 121 if the TCU 118 determines it is safe or efficient to do so under the current engine speed and torque conditions, the vehicle speed, and/or other limiting operating conditions. For example, before acting upon the performance mode request 121, the TCU 118 may perform calculations to ensure the requested gear results in an engine and/or transmission speed that are within acceptable limits. Further, the specific timing of the gear state change and modified torque limit may be affected by the vehicle speed, among other factors.

Under certain instantaneous operating conditions, the selection and communication of a particular FE or nominal gear command 120 under FE controller 110 may be suboptimal under the present conditions. Examples of operating conditions under which the FE controller 110 and/or ECU 112 may communicate the performance mode request 121 to the TCU 118 to provide a modified gear command 120' include, but are not limited to: gear downshift prior to a steep uphill event; gear downshift approaching a traffic signal; delayed gear upshift for on-ramp or merging traffic condition; and selection of a desired gear state during a steep uphill event such that sufficient engine power is available.

Communication between the hardware components of the vehicle system 100, such as the route parameter manager 114, the FE controller 110, the ECU 112, and/or the TCU 118, may be conveyed via controlled area network (i.e., CAN bus) or any suitable communication protocol. In certain embodiments, the route parameter manager 114 may accept input from a global positioning system (GPS) receiver 116, which can provide the route parameter manager 114 with the route condition information, for example, the current latitude and longitude of the vehicle relative to available data of the terrain of the route. Such terrain data may be stored within a navigation system of the vehicle, may be accessed in real-time via mobile communication link, or mode available by any suitable means. In certain embodiments, the GPS receiver 116 and route parameter manager 114 may be a part of or separate from the navigation system of the vehicle. Alternatively, the GPS receiver 116 and route parameter manager 114 may be a part of the ECU 112 or may be disposed in a separate control module associated with the vehicle.

In certain embodiments, the route condition information may be provided to the FE controller 110 and/or ECU 112 by an intelligent transportation system (ITS) or similar system. An ITS generally refers to the integration of information and communication technologies with transport infrastructure to improve economic performance, safety, mobility and environmental sustainability. An ITS may include real-time traffic information systems that collect data on traffic conditions, aggregate and translate the data, and disseminate the traffic data through various technologies. Such systems may enable dynamic route grade profiling through vehicle-to-vehicle communications, where grade information from preceding vehicles is provided to the route parameter manager 114. Similarly, vehicles in the proximity of the route may provide speed and gear state information indicative of traffic volume, actual traffic speeds, and other dynamic route condition information that the FE controller 110 and/or ECU 112 may use to adjust the gear state and/or vehicle speed.

For example, the controls may determine that it is not desired to increase vehicle speed or change gear state from the nominal shift schedule dictated by the FE or nominal gear command 120 and FE or nominal torque limit 128 where forward traffic or traffic control devices within the look-ahead window indicate that such changes would necessitate a braking event within a predetermined window. In yet another example, the controls may coordinate multiple vehicles via the ITS to improve performance by platooning vehicles and selecting speeds and gear states to improve fuel efficiency and/or drivability of the vehicle fleet with respect to the route conditions. Thus, the route condition information may include data from other vehicles (e.g., via an ITS), and the controls may be configured to optimize the aggregate performance of more than one vehicle.

Further, the FE controller 110 and/or ECU 112 may communicate the determined torque limit 128, 128' to a fuel control module 119 included in the engine 122. In certain embodiments, the fuel control module 119 may be included in the ECU 112. The fuel control module 119 subsequently interrogates the torque limit 128, 128' and, if the fuel control module 119 determines it is safe or efficient to do so under the current vehicle and engine operating conditions, the fuel control module 119 may generate a fuel command to the engine 122 to adjust the fuel state of the engine 122, thus affecting its speed and the speed of the vehicle. In certain embodiments, the fuel control module 119 may include an air control to regulate the mass of air flowing into the engine 122. In such embodiments, the fuel control module 119 may generate an air command to the engine 122 to adjust the air state of the engine 122 in response to the modified torque limit 128', thus affecting its speed and the speed of the vehicle. Accordingly, the FE controller 110 and/or ECU 112 may control both the gear state of the transmission 124 and the speed of the vehicle (via the speed of the engine 122 at the selected gear state) in concert with each other to improve performance, drivability, and/or fuel economy of the vehicle over what is achievable by controlling gear state and engine speed separately.

The control architectures disclosed herein provide the signals and flexibility for the controls to request gear shifts and select torque limits in an optimized manner for fuel efficiency or other operating mode and to override these selections for performance and/or driveability along the route in response to look ahead route conditions. The optimized manner for fuel efficiency may be customized through calibration parameters to optimize a performance metric or metrics using criteria developed for various route conditions. The selections for the gear state and torque limit may be overridden in order to, without being limited to, provide the ability to maintain or increase vehicle set speed on various grades or part of a route; and/or to obtain an acceleration response over ranges of speed and grade and/or route pattern, traffic conditions, traffic control signs and signals and their location, and speed limits.

The ECU 112 may be structured to control command parameters of the vehicle powertrain, including the engine 122 and/or the transmission 124. In certain embodiments, the ECU 112 may be a portion of a processing subsystem including one or more computing devices having memory, processing, and communication hardware. The ECU 112 may be a single device or a distributed device, and the functions of the ECU 112, including those of the FE controller 110, may be performed by hardware or software. The ECU 112 may comprise digital circuitry, analog circuitry, or a hybrid combination of both of these types. The ECU 112 may include one or more Arithmetic Logic Units (ALUs), Central Processing Units (CPUs), memories, limiters, conditioners, filters, format converters, or the like which are not shown to preserve clarity.

Further, the ECU 112 may be programmable, an integrated state machine, or a hybrid combination thereof. In at least one embodiment, the ECU 112 is programmable and executes controls and processes data in accordance with operating logic that is defined by programming instructions such as software or firmware. Alternatively or additionally, operating logic for the ECU 112 may be at least partially defined by hardwired logic or other hardware. It should be appreciated that the ECU 112 may be exclusively dedicated to controlling the vehicle powertrain or may further be used in the regulation, control, and/or activation of one or more other subsystems or aspects of the vehicle.

Examples of systems, methods and apparatuses for controlling vehicle speed and/or gear state selection to improve vehicle performance can be found, for example, in U.S. patent application Ser. No. 14/719,917 filed on May 22, 2015, and U.S. patent application Ser. No. 14/625,951 filed on Feb. 19, 2015, each of which is incorporated herein by reference in its entirety.

Referring to FIGS. 2A-2D there are illustrated graphs 200, 202, 204, and 206 depicting an example route condition with a route pattern associated with an on-ramp, vehicle speed, torque limits, and gear state changes, respectively, of a vehicle 208. Graph 200 depicts a vehicle 208 on an on-ramp 210 in an approach to an interstate roadway 212. Operating vehicle 208 with an FE or nominal gear command 120 and an FE or nominal torque limit 128 governed by FE controller 110 and/or ECU 112 may not allow vehicle 208 to obtain a vehicle speed that provides a safe or desired vehicle speed relative to the traffic on roadway 212. Therefore, FE controller 110 and/or ECU 112 provides a performance mode request 121 and modified torque limit 128', as discussed above and illustrated in FIGS. 2B-2D, that overrides the FE or nominal gear requests and FE or nominal torque limit 128.

Graphs 202, 204, 206 depict distance on their respective horizontal axes along a vehicle operating route including on-ramp 210 and roadway 212. Graph 202 depicts vehicle speed on its vertical axis in response to FE or nominal control and modified control in which FE or nominal control is overridden. Graph 204 depicts torque limits on its vertical axis during FE or nominal control and the removal of torque limits in response to a modified control of the vehicle 208 in response to look ahead route conditions in which FE or nominal limits are overridden. Graph 206 depicts various transmission gear states on its vertical axis in response to FE or nominal gear command 120 and modified gear command 120' along the route that may be implemented in view of the performance mode request 121.

Figure 2A:
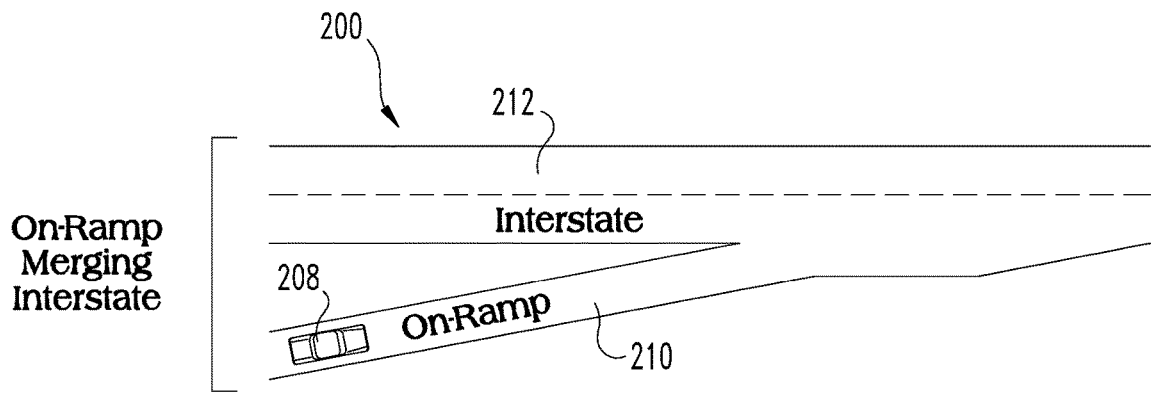
FIG. 2A-2D depict graphs illustrating a route condition, speed, torque and gear state changes, respectively, of a vehicle employing engine and transmission controls to override fuel efficiency vehicle speed and gear state selections.
Figure 2B:
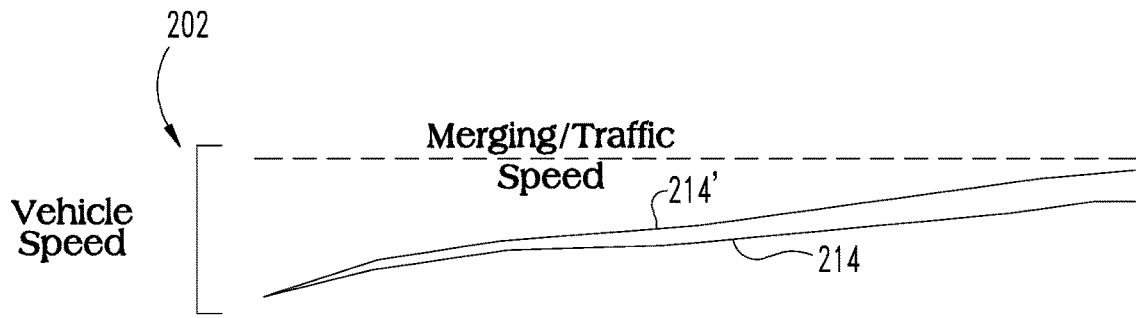
Figure 2C:
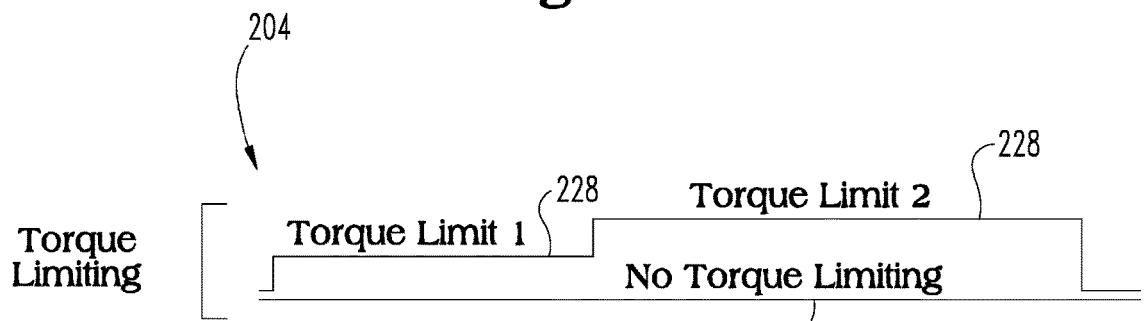
Figure 2D:
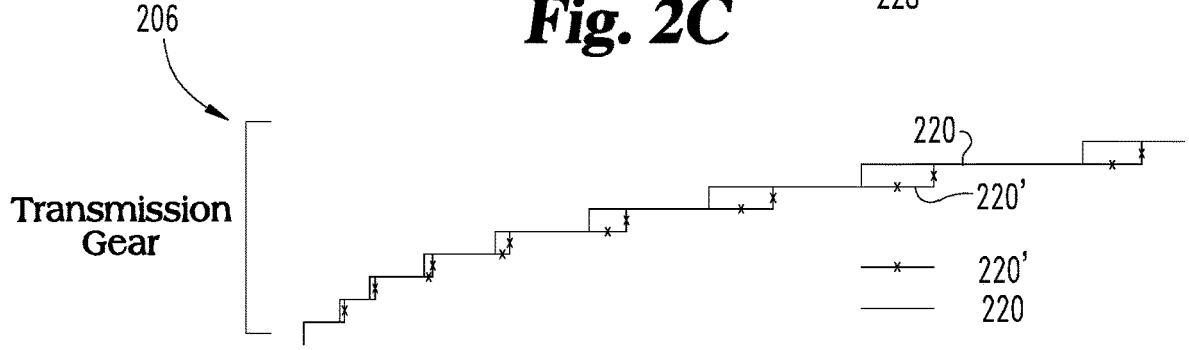

The effects using FE or nominal controls and overriding those controls according to the present disclosure are illustrated through a comparison of the operation of vehicle 208 indicated by the vehicle speed curves 214, 214' in FIG. 2B in response to the torque limits 228, 228' in FIG. 2C and transmission gear state selections 220, 220' in FIG. 2D. In FIG. 2C, the torque limits 228 that are applied to engine 122 during FE or nominal control are removed, as indicated by modified torque limit 228'. In one embodiment, the modified torque limit 228' in response to the performance mode request 121 results in the removal of any torque limit.

As illustrated by vehicle speed curves 214 and 214', when vehicle 208 operates without using FE or nominal controls, modified vehicle speed curve 214' indicates a greater vehicle speed and/or acceleration is attained than with FE or nominal controls as indicated by vehicle speed curve 214. In addition, modified gear state selections 220' show the modified gear commands 120' that delay upshifts in the transmission gear relative to the FE or nominal gear state selections 220 of FE gear commands 120'. As a result, more torque or power output from engine 122 of vehicle 208 is available than when under FE or nominal control, and vehicle 208 can accelerate more quickly on on-ramp 210 to merge with traffic on roadway 212. As discussed above, other look ahead route conditions such as an uphill grade could also result in override of FE or nominal controls to make more power or torque available from engine 122 than what is provide under FE or nominal control.

Figure 3:
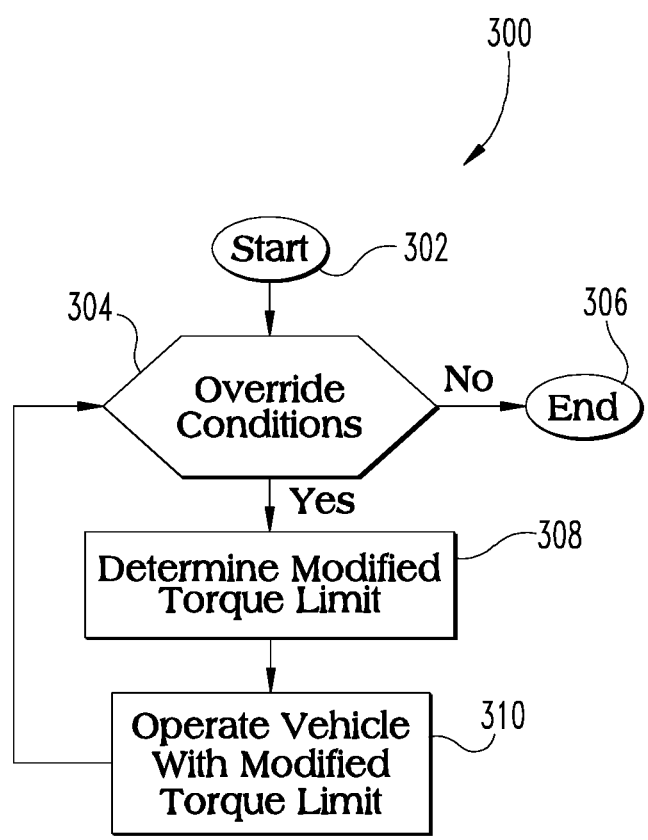
FIG. 3 is a flow diagram of exemplary engine and transmission control method aspects.

FIG. 3 illustrates a flow diagram of an exemplary process 300 for arbitrating between FE or nominal control and vehicle performance. In one strategy, if the vehicle is nominally operated with FE control as a user selected feature to provide fuel efficiency at the sacrifice of vehicle performance and/or driveability, at least in certain conditions. In the FE control strategy, the torque limits and gear ratio in which the predicted powertrain efficiency or fuel efficiency is maximized is selected. When FE or nominal control is overridden, torque limits are increased or removed, and all gear ratios which result in the vehicle not being power limited while maintaining engine speed within minimum and maximum constraints are determined. If the vehicle is not power limited, all gear ratios are available which maintain engine speed within maximum and minimum limits.

Process 300 begins at start operation 302, and proceeds to conditional 304 which determines if override conditions are present for a nominal or FE mode of operation. The override conditions can include, for example, look ahead route information for the vehicle route indicating a condition which requires power or torque output from the vehicle that is not available under FE or nominal control. If FE or nominal control override conditions are not present process 300 proceeds to end operation 306. If FE or nominal control override conditions are present process 300 proceeds to operation 308 which determines a modified torque limit. Process 300 proceeds to operation 310 to operate the vehicle in response to the modified torque limit 128' and with a performance mode request 121 to the TCU 118 to obtain the desired acceleration and performance needed to respond to the look ahead route condition.

From operation 310, process 300 returns to conditional 304 to determine if the FE or nominal control override conditions are still present. If so, override control is continued. If not process 300 ends at 306.

A number of exemplary aspects of the present disclosure are contemplated. For example, according to one aspect, a vehicle system includes an engine configured to output torque and a transmission structured to receive torque from the engine and to output torque to propel the vehicle system. The system also includes an electronic control system operatively coupled with the engine and the transmission. The electronic control system is structured to determine a modified torque limit for the engine in response to look ahead route information for at least part of a route to be traveled by the vehicle system. The modified torque limit includes a torque limit of the engine that is greater than a current torque limit. The electronic control system is also structured to determine a performance mode request that defines a gear state of the transmission different from a default shift schedule gear state, and control the engine and the transmission in response to the modified torque limit and the performance mode request.

In one embodiment, the electronic control system is structured to determine the modified torque limit in order to allow an increased speed or acceleration of the vehicle system as compared to the current torque limit. In a refinement of this embodiment, the electronic control system is structured to determine the performance mode request in order to maintain a current gear state in a lower gear for a longer duration than the default shift schedule gear state as the speed of the vehicle system increases. In another refinement of this embodiment, the electronic control system is structured to determine the performance mode request in order to delay an upshift from the current gear state of the transmission as the speed of the vehicle system increases.

In another embodiment, the electronic control system is structured to determine the modified torque limit and the modified gear request in order to provide modified operation of the engine with decreased fuel economy relative to unmodified operation of the engine in response to the current torque limit and default shift schedule.

In yet another embodiment, the current torque limit is a user-selected torque limit and the electronic control system is structured to disable the user-selected torque limit in response to the look ahead route information indicating an increased projected engine power requirement for the engine. In various refinements, the look ahead route information indicating the increased power requirement is one or more of an on-ramp and an up-hill grade. In another refinement, the user-selected torque limit provides a greater fuel efficiency than the modified torque limit.

In another aspect, a method of controlling a vehicle system including an engine, a transmission coupled with the engine, and an electronic control system coupled with the engine and the transmission is provided. The method includes operating the electronic control system to perform the acts of: determining a modified torque limit setting in response to look ahead route information for at least part of a route to be traveled by the vehicle system, the modified torque limit comprising a torque limit of the engine that is greater than a current torque limit; determining a performance mode request defining a gear state of the transmission different from a default shift schedule gear state; and controlling the engine and the transmission in response to the modified torque limit and the performance mode request.

In one embodiment, the modified torque limit allows an increased speed or acceleration of the vehicle system as compared to the current torque limit. In a refinement of this embodiment, the performance mode request maintains a current gear state in a lower gear for a longer duration than the default shift schedule gear state as the speed of the vehicle system increases. In another refinement, the performance mode request delays an upshift from the current gear state of the transmission as the speed of the vehicle system increases.

In another embodiment, the modified torque limit and the performance mode request provide modified operation of the engine with decreased efficiency relative to unmodified operation of the engine in response to the current torque limit and default shift schedule. In yet another embodiment, the look ahead route information indicating the increased power requirement is at least one of an on-ramp and an up-hill grade.

According to yet another aspect, an apparatus is provided that includes an electronic control system configured to control operation of an engine and a transmission of a vehicle system by executing instructions stored in a non-transitory controller-readable medium. The control system is configured to perform the acts of: determining a modified torque limit setting in response to look ahead route information for at least part of a route to be traveled by the vehicle system, the modified torque limit comprising a torque limit of the engine that is greater than a current torque limit; determining a performance mode defining a gear state of the transmission different from a default shift schedule gear state; and controlling the engine and the transmission in response to the modified torque limit and the performance mode request.

In one embodiment, the modified torque limit allows an increased speed or acceleration of the vehicle system as compared to the current torque limit. In one refinement of this embodiment, the performance mode request maintains a current gear state in a lower gear for a longer duration than the default shift schedule gear state as the speed of the vehicle system increases. In another refinement, the performance mode request delays an upshift from the current gear state of the transmission as the speed of the vehicle system increases.

In another embodiment, the modified torque limit and the performance mode request provide modified operation of the engine with decreased fuel economy relative to unmodified operation of the engine in response to the current torque limit and default shift schedule.

As will be understood by one skilled in the art having the benefit of the present disclosure, the terms used to identify the components of the systems and methods disclosed herein may be similarly described by other terms unless explicitly provided to the contrary. While various embodiments of an engine and transmission control system and methods for using the same have been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected. A variety of further embodiments according to the present disclosure are contemplated. Those skilled in the art will appreciate that many modifications are possible in the example embodiments without materially departing from this disclosure. Accordingly, all such modifications are intended to be included within the scope of this disclosure as defined in the following claims.

The invention claimed is:

1. A vehicle system comprising:
an engine configured to output torque;
a transmission structured to receive torque from the engine and to output torque to propel the vehicle system;
an electronic control system operatively coupled with the engine and the transmission, the electronic control system being structured to:
  determine a modified torque limit for the engine in response to look ahead route information for at least part of a route to be traveled by the vehicle system, the modified torque limit comprising a torque limit of the engine that is greater than a current torque limit, wherein the current torque limit is a user-selected torque limit;
  determine a performance mode request defining a gear state of the transmission different from a default shift schedule gear state; and
  control the engine and the transmission in response to the modified torque limit and the performance mode request.

2. The vehicle system according to claim 1, wherein the electronic control system is structured to determine the modified torque limit in order to allow an increased speed or acceleration of the vehicle system as compared to the current torque limit.

3. The vehicle system according to claim 2, wherein the electronic control system is structured to determine the performance mode in order to maintain a current gear state in a lower gear for a longer duration than the default shift schedule gear state as the speed of the vehicle system increases.

4. The vehicle system according to claim 2, wherein the electronic control system is structured to determine the performance mode request in order to delay an upshift from the current gear state of the transmission as the speed of the vehicle system increases.

5. The vehicle system according to claim 1, wherein the electronic control system is structured to determine the modified torque limit and the performance mode request in order to provide modified operation of the engine with decreased fuel economy relative to unmodified operation of the engine in response to the current torque limit and default shift schedule.

6. The vehicle system according to claim 1, wherein the electronic control system is structured to disable the user-selected torque limit in response to the look ahead route information indicating an increased projected engine power requirement for the engine.

7. The vehicle system according to claim 6, wherein the look ahead route information indicating the increased power requirement is an on-ramp.

8. The vehicle system according to claim 6, wherein the look ahead route information indicating the increased power requirement is an up-hill grade.

9. The vehicle system according to claim 6, wherein the user-selected torque limit provides a greater fuel economy than the modified torque limit.

10. A method of controlling a vehicle system including an engine, a transmission coupled with the engine and an electronic control system coupled with the engine and the transmission, the method comprising operating the electronic control system to perform the acts of:
  determining a modified torque limit setting in response to look ahead route information for at least part of a route to be traveled by the vehicle system, the modified torque limit comprising a torque limit of the engine that is greater than a current torque limit, wherein the current torque limit is a user-selected torque limit;
  determining a performance mode request defining a gear state of the transmission different from a default shift schedule gear state; and
  controlling the engine and the transmission in response to the modified torque limit and the performance mode request.

11. The method according to claim 10, wherein:
the electronic control system is structured to disable the user-selected torque limit in response to the look ahead route information indicating an increased projected engine power requirement for the engine; and
the modified torque limit allows an increased speed or acceleration of the vehicle system as compared to the current torque limit.

12. The method according to claim 11, wherein the performance mode request maintains a current gear state in a lower gear for a longer duration than the default shift schedule gear state as the speed of the vehicle system increases.

13. The method according to claim 11, wherein the performance mode request delays an upshift from the current gear state of the transmission as the speed of the vehicle system increases.

14. The method according to claim 10, wherein the modified torque limit and the performance mode request provide modified operation of the engine with increased fuel consumption relative to unmodified operation of the engine in response to the current torque limit and default shift schedule.

15. The method according to claim 10, wherein the look ahead route information indicating the increased power requirement is one at least one of an on-ramp and an up-hill grade.

16. An apparatus comprising:
an electronic control system configured to control operation of an engine and a transmission of a vehicle system by executing instructions stored in a non-transitory controller-readable medium to perform the acts of:

determining a modified torque limit setting in response to look ahead route information for at least part of a route to be traveled by the vehicle system, the modified torque limit comprising a torque limit of the engine that is greater than a current torque limit, wherein the current torque limit is a user-selected torque limit;

determining a performance mode request defining a gear state of the transmission different from a default shift schedule gear state; and controlling the engine and the transmission in response to the modified torque limit and the performance mode request.

17. The apparatus according to claim 16, wherein:

wherein the electronic control system is structured to disable the user-selected torque limit in response to the look ahead route information indicating an increased projected engine power requirement for the engine; and the modified torque limit allows an increased speed or acceleration of the vehicle system as compared to the current torque limit.

18. The apparatus according to claim 17, wherein the performance mode request maintains a current gear state in a lower gear for a longer duration than the default shift schedule gear state as the speed of the vehicle system increases.

19. The apparatus according to claim 17, wherein the performance mode request delays an upshift from the current gear state of the transmission as the speed of the vehicle system increases.

20. The apparatus of claim 16, wherein the modified torque limit and the performance mode request provide modified operation of the engine with decreased fuel economy relative to unmodified operation of the engine in response to the current torque limit and default shift schedule.

* * * * *